United States Patent [19]
Nakama et al.

[11] Patent Number: 5,929,598
[45] Date of Patent: Jul. 27, 1999

[54] NONCONTACT CHARGING DEVICE, CHARGER, CORDLESS ELECTRIC EQUIPMENT, AND NONCONTACT CHARGER

[75] Inventors: Hidekazu Nakama; Toshiaki Fujikura; Akitsugu Shigino, all of Chiba, Japan

[73] Assignee: Uniden Corporation, Tokyo, Japan

[21] Appl. No.: 08/888,122

[22] Filed: Jul. 3, 1997

[30] Foreign Application Priority Data

Jul. 3, 1996 [JP] Japan .................................. 8-173976

[51] Int. Cl.⁶ ............................................. H01M 10/46
[52] U.S. Cl. ................................................. 320/108
[58] Field of Search ................................. 320/107, 108, 320/109, 114, DIG. 23, FOR 101; 336/DIG. 2

[56] References Cited

U.S. PATENT DOCUMENTS

| | | | |
|---|---|---|---|
| 4,031,449 | 6/1977 | Trombly | 320/108 |
| 4,202,031 | 5/1980 | Hesler et al. | 363/97 |
| 5,157,319 | 10/1992 | Klontz et al. | 320/108 |
| 5,327,065 | 7/1994 | Bruni et al. | 320/108 |
| 5,490,053 | 2/1996 | Tkacenko et al. | 363/15 |
| 5,550,452 | 8/1996 | Shirai et al. | 320/108 |
| 5,600,225 | 2/1997 | Goto | 320/108 |

FOREIGN PATENT DOCUMENTS

| | | |
|---|---|---|
| 54-12422 | 1/1979 | Japan . |
| 5-300662 | 11/1992 | Japan . |
| 5-64375 | 3/1993 | Japan . |
| 7-75257 | 3/1995 | Japan . |
| 7-170312 | 7/1995 | Japan . |

*Primary Examiner*—Edward H. Tso
*Attorney, Agent, or Firm*—McDermott, Will & Emery

[57] ABSTRACT

Capacitors are connected in parallel to a primary side induction coil in a charger 1 and a secondary side induction coil in a cordless equipment (handset unit) respectively, and LC parallel resonance circuits are formed in the charger and the cordless equipment respectively with this parallel connection. Each of the primary side induction coil and secondary side induction coil is formed with a sheet coil, and the sheet coils are arranged and fixed in the charger and the cordless equipment respectively so that the sheet coils face to each other with a prespecified gap in the charging state where the cordless equipment has been set in the charger.

24 Claims, 7 Drawing Sheets

NONCONTACT CHARGING DEVICE, CHARGER, CORDLESS ELECTRIC EQUIPMENT, AND NONCONTACT CHARGER

FIELD OF THE INVENTION

The present invention relates to noncontact charging device, and a charger and a cordless equipment used in a noncontact charging device as well as to a noncontact charging device, and more particularly to a charging device for charging in a noncontact form and by making use of mutual induction a secondary battery incorporated in a cordless equipment such as a cordless handset or a portable telephone set, and to a charger and a cordless equipment used in a noncontact charging device.

BACKGROUND OF THE INVENTION

There has been proposed to execute power transmission to a cordless equipment by making use of mutual induction (electromagnetic induction) by an induction coil for the purpose of charging a secondary battery such as a nickel-cadmium battery or a lithium ion battery incorporated in the cordless equipment such as a cordless handset or a portable telephone set, and the scheme as described above is disclosed, for instance, in Japanese Patent Laid-Open Publication No. SHO 54-12422, Japanese Patent Laid-Open Publication No. HEI 5-64375, Japanese Patent Laid-Open Publication No. HEI 5-300662, and Japanese Patent Laid-Open Publication No. HEI 7-170312.

In a noncontact charging device for executing power transmission by making use of mutual induction, a primary side induction coil is provided in a charger, a secondary side induction coil is provided in a cordless equipment, an LC resonance circuit is formed in the charger as well as in the cordless equipment with a combination with a capacitor, and power is transmitted to the cordless equipment from the charger by making use of electromagnetic induction under high frequency oscillation.

In order to efficiently transmit power by making use of mutual induction, it is necessary to set a degree of magnetic connection between a primary side induction coil and a secondary side induction to an appropriate value under high frequency resonance, and in order to set the degree of electromagnetic connection to an appropriate degree, it is required to satisfy the prerequisites not only that the cordless equipment must be positioned against the charger when charged, but also that a mounting position for the coil in each of the charger and cordless equipment has been set with high precision.

In other words, when charging, the primary side induction coil and the secondary side induction coil must be magnetically connected at a prespecified gap to each other so that they are connected to each other with a high magnetic flux density atmosphere, and also it is desired that the magnetic connection area is large, and otherwise waste of electric power disadvantageously increases.

However, a primary side induction coil and a secondary side induction coil in a conventional type of noncontact charging device are wound coils, and for this reason it is difficult to set mounting positions for the induction coils in a charger as well as in a cordless equipment with high precision, and also the construction for mounting is complicated. In a case of a wound coil, if the wound coil is one having a specific form with a core, precision in the mounting position for an induction coil is high, but in this case construction of the induction coil is complicated and the cost is high.

Also the magnetic connection area is enlarged when a winding diameter or the number of turns of winding increases, but this makes size and weight of the induction coil larger, and it is hard to use this type of induction coil in a cordless equipment with portability such as a portable telephone set which is desired to be less in size and weight.

Also in a noncontact charging device based on the mutual induction system as described above, even in a state where a cordless equipment has not been set in a charger (in a stand-by state), if a metallic conductor such as coin is placed on a charger while the primary side induction coil in the charger is oscillating at the same output level as that in charging, an eddy current flows in the metallic conductor due to a magnetic field caused by the primary side induction coil, which generates induction heating and increase in wasteful power consumption.

SUMMARY OF THE INVENTION

It is a main object of the present invention to provide a noncontact charging device with little wasteful power consumption, and more particularly to provide a noncontact charging device as well as a charger and a cordless equipment each with little wasteful power consumption in which mutual induction can efficiently be executed with an appropriate gap by using low cost and high productivity induction coils without making construction of the coil itself or mounting construction thereof complicated and further a marge magnetic connection area can be obtained without making size and weight of the induction coil larger, and further to provide a noncontact charger and a cordless equipment with little wasteful power consumption by improving the devices so that substantial induction heating will not be generated even if a metallic conductor is placed by mistake on the charger in the stand-by state.

In order to achieve the objects as described above, in the noncontact charging device according to the invention for transmitting power, by making use of mutual induction between a primary side induction coil provided in a charger and a secondary side induction coil provided in a cordless equipment incorporating a secondary battery therein, from the charger to the cordless and charging the secondary battery, capacitors are connected in parallel to the primary side induction coil as well as to the secondary side induction coil respectively and an LC parallel resonance circuit is formed with this parallel connection in each of the charger and the cordless equipment, each of the primary side induction coil and the secondary side induction coil is built with a sheet coil and the sheet coils are provided and fixed in the charger and the cordless equipment so that the sheet coils face to each other at a specified gap from each other in the charging state where the cordless equipment is set in the charger.

In the noncontact charging device according to the present invention, a double tuning circuit is formed with a combination of LC parallel resonance circuits each formed in a charger and a cordless equipment respectively, and power transmission from the charger to the cordless equipment is executed by means of mutual induction by the double tuning circuit. Each of the primary side induction coil and secondary side induction coil is formed with a sheet coil, so that construction of the coil itself and mounting construction thereof are not complicated, and with this feature, mutual induction between the induction coils can efficiently be executed with an appropriate gap and also with a large magnetic connection area without making size of weight of the coils larger.

With the invention, in the noncontact charging device, the gap is set to a dimension where a critical connection state can be achieved between the primary side induction coil and the secondary side induction coil.

As a critical connection state is achieved depending on a magnetic connection coefficient in a double tuning circuit based on a combination of LC parallel resonance circuits, in the invention, the critical connection state is achieved when a gap between the primary side induction coil and secondary side induction coil is set to an appropriate value, and then efficient power transmission is executed with maximum and single peak frequency characteristics.

With the invention, in the noncontact charging device according to the present invention, the sheet coil is spirally patterned on a plane.

In the noncontact charging device according to the above invention, a sheet coil is spirally patterned on one plane, so that a large plane-formed magnetic field can be obtained with a small space, which insures a large magnetic connection area without making size and weight of coils larger.

With the invention, in the noncontact charging device according to the present invention, the sheet coil comprises a pattern inductor patterned on a printed board.

In the noncontact charging device according to the present invention, the sheet coil comprises a pattern inductor patterned on a printed board, and the pattern inductors can be mass-produced with stable performance and high productivity and also with low cost, so that the sheet coil can comprise a high quality and low cost product.

The invention provides a charger in the noncontact charging device according to the present invention.

The charger according to the present invention functions as a charger in the noncontact charging device according to the present invention.

The invention provides a cordless equipment in the noncontact charging device according to the present invention.

The cordless equipment according to the above invention functions as a cordless invention in the noncontact charging device according to the present invention.

Also to achieve the objects as described above, with the invention, the noncontact charger according to the invention for transmitting power to a cordless equipment including a secondary side induction coil and a secondary battery by making use of mutual induction by a primary side coil to charge the secondary battery comprises a resonance circuit including a primary side induction coil; a resonance state switching means for switching a resonant voltage level in the resonance circuit between a high level and a low level; and a mutual induction state detecting means for checking whether the primary side induction coil is in the mutual induction state or not according to oscillation amplitude in the resonance circuit, and in the noncontact charger, the a oscillation voltage level in the resonance circuit is set to a high level by the resonance state switching means when a mutual induction state is being detected by the mutual induction state detecting means, and otherwise is set to a low level by the resonance state switching means.

In the noncontact charger according to the above invention, when a cordless equipment is set in the charger, the primary side induction coil is set in the mutual induction state, and in this state, a mutual induction state detecting means detects the mutual induction state, and an oscillation voltage level in the resonance circuit is set by the resonance state switching means to a high level. In contrast, in a state where a cordless equipment has not been set in the charger, the primary side induction coil is set in a state other than the mutual induction state, and in this state, the mutual induction state detecting means detects that the primary side induction coil is not in the mutual induction state, and a oscillation voltage level in the resonance circuit is set by the resonance state switching means to a low level.

With the invention, in the noncontact charger according to the present invention, the mutual induction state detecting means comprises a variable amplifier for catching change in oscillation amplitude in the resonance circuit as a voltage change and amplifying it, and a comparator for comparing an output voltage from the variable amplifier to a reference value for comparison, and the comparator outputs a determination signal indicating according to a result of comparison whether the primary side induction coil is in the mutual induction state or not, and the variable amplifier sets an offset voltage in the state where the mutual induction state has not been effected to a level lower than that in the state where the mutual induction state has been effected according to the determination signal.

In the noncontact charger according to the above invention, the variable amplifier catches change in oscillation amplitude in the resonance circuit as voltage change and amplifies it, the comparator compares an output voltage from the variable amplifier to a reference value for comparison, and an determination signal indicating whether the primary side induction coil is in the mutual induction state or not is outputted according to a result of comparison. This determination signal is given to the variable amplifier, and an offset voltage in the variable amplifier when it is indicated by the determination signal that the primary side induction coil is not in the mutual induction state is set to a lever lower than that in the state where the primary side induction coil is in the mutual induction state, so that the offset voltage is switched according to whether a resonance voltage in the resonance circuit is at a high level or at a low level. With this feature, even if there is only one reference voltage for comparison of the comparator, or regardless of whether a resonance voltage in the resonance circuit is at a high level or at a low level, whether the primary side induction coil is in the mutual induction state or not can accurately be determined.

With the invention, in the noncontact charger according to the present inventon, the variable amplifier sets an amplification factor in the state where it is determined according to a determination signal outputted from the comparator that the mutual induction state has not been effected to a level higher than that in the state where the mutual induction state has been effected.

In the noncontact charger according to the above invention, a determination signal is given to the variable amplifier, and an amplification factor for the variable amplifier in a state other than the mutual induction state is set to a value larger than that in the mutual induction state, so that, in the state where an output voltage from the variable amplifier has largely changed in response to change in oscillation amplitude and a oscillation voltage level in the resonance circuit is at a low level at the state other than the mutual induction state, and also in the stand-by (idle) state where a cordless equipment is not set in the charger, even if the oscillation amplitude changes a little when a cordless equipment is set in the charger, the fact that the cordless equipment has been set is accurately detected by the comparator.

With the invention, the noncontact charger according to the present invention comprises a delay circuit for delaying a timing when the determination signal is given to the oscillation state switching means.

In the noncontact charger according to the above invention, input of a determination signal into the oscillation state switching means is delayed by the delay circuit. With this feature, switching of oscillation state is executed after output state of the variable amplifier is stabilized.

With the invention, in the noncontact charger according to the present invention, the mutual induction state detecting means comprises a first comparator for comparing a resonance voltage obtained according to oscillation amplitude in the resonance circuit to a first reference value for comparison and a second comparator for comparing a resonance voltage obtained according to oscillation amplitude in the resonance circuit to a second reference value for comparison larger than the first reference value for comparison, and a determination signal indicating whether the primary side induction coil is in the mutual induction state or not is outputted with a combination of an output signal from the first comparator and that from the second comparator.

In the noncontact charger according to the above invention, the first comparator compares a resonance voltage obtained according to oscillation amplitude in the resonance circuit to a first reference value for comparison; the second comparator compares a resonance voltage obtained according to oscillation amplitude in the resonance circuit to a second reference value for comparison larger than the first reference value for comparison, and a determination signal indicating whether the primary side induction coil is in the mutual induction state or not is outputted as a combination of output signals from the first and second comparators.

With the invention, in the cordless equipment charged by a noncontact charger according to the present invention, the rectification circuit provided between the secondary side induction coil and the secondary battery is a double voltage rectification circuit.

In the cordless equipment according to the above invention, a voltage between terminals of the secondary battery seems to be ½ of the actual value when viewed from the input side because of the double voltage rectification circuit. With this feature, even if the oscillation level is low in the stand-by state, when a cordless equipment is set in the charger, a charging current flows without fail, and the fact that the cordless equipment has been set in the charger is detected by checking change in oscillation amplitude in the charger.

Other objects and features of this invention will become understood from the following description with reference to the accompanying drawings.

DESCRIPTION OF THE PREFERRED EMBODIMENTS

Figure 1:
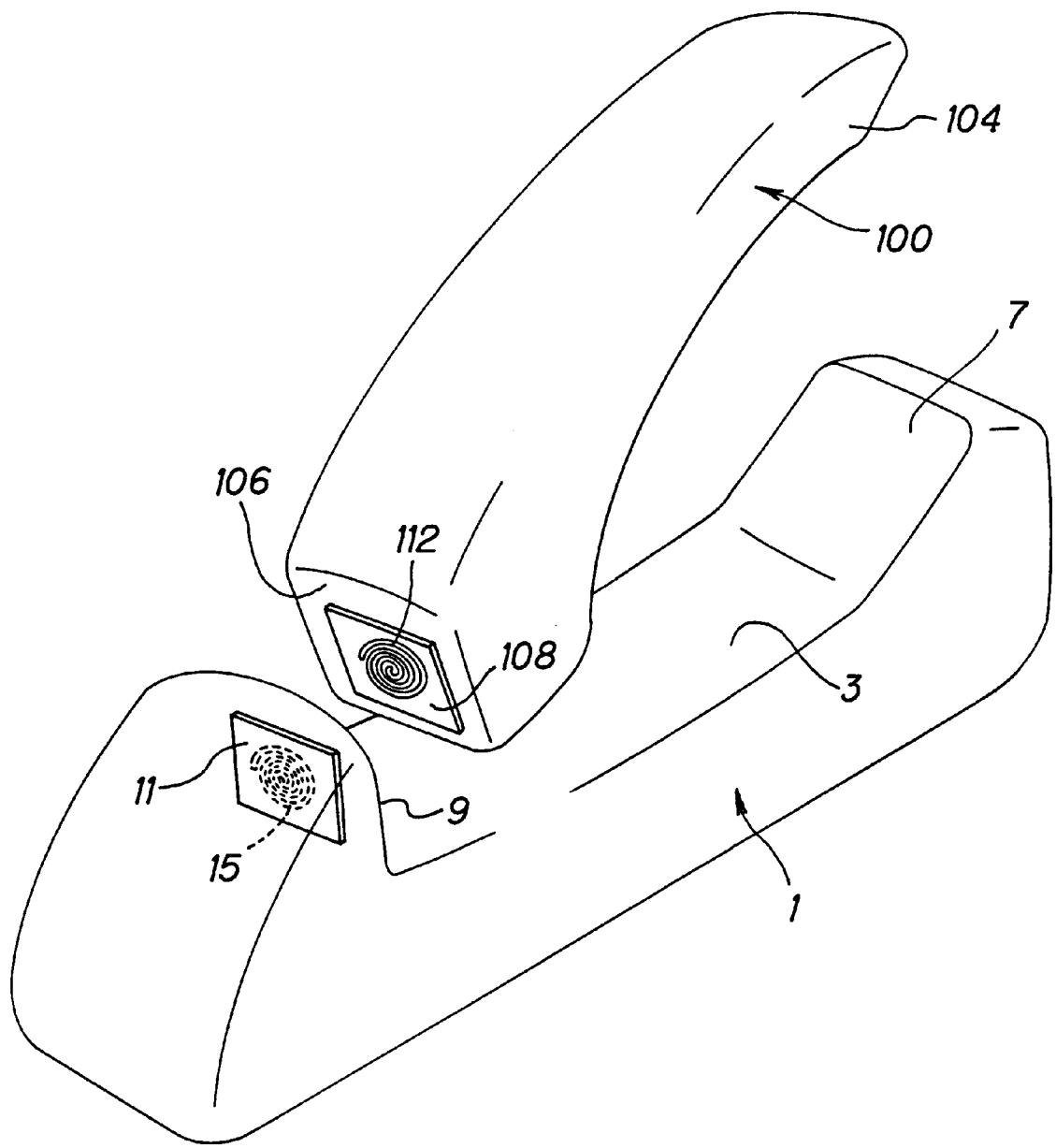
FIG. 1 is a perspective view showing one embodiment of the noncontact charging device according to the present invention.

Next detailed description is made for embodiments of the present invention with reference to the related drawings.

FIG. 1 to FIG. 4 show one embodiment of the noncontact charging device according to the present invention. In the figures, the reference numeral 1 indicates a charger, and the reference numeral 100 indicates a cordless handset (sometimes described as a handset unit hereinafter) of a telephone set as a cordless equipment.

The charger 1 has an outer casing 5 with a handset unit mounting base 3 on which the handset unit 100 is placed. The outer casing 5 comprises a inclined pillow section 7 on which a head section 104 of the outer casing 102 of the handset unit 100 is mounted, and an electromagnetic induction surface section 9, and when the head section 104 is placed on the inclined pillow section 7, a bottom surface section 106 of the outer casing 102 faces to and contacts a electromagnetic induction surface section 9, and the handset unit 100 is positioned and set on the handset unit mounting base 3.

A printed board 11 is fixed and set with an engaging claw 13 on an internal surface of the electromagnetic induction surface section 9 of the charger 1. On a surface of the printed board 11 (a surface in the side of the electromagnetic induction surface section 9), as well shown in FIG. 4, a conductor 14 is spirally patterned, and a pattern inductor, in other words a primary side induction coil 15 having a spiral form comprising a sheet coil is planarly formed with the conductor 14.

A sheet coil face (surface) of the printed board 11 uniformly contacts and joints to the entire internal surface of the electromagnetic induction surface section 9 when set on the electromagnetic induction surface section 9 of the printed board 11 with the engaging claw 13. This feature is very important for maintaining a gap between coils at an appropriate value during mutual induction described later.

Figure 3:
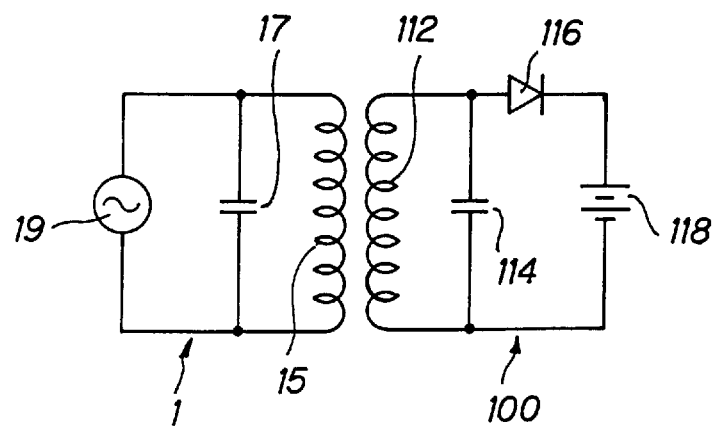
FIG. 3 is a partial cross-sectional view showing one embodiment of the noncontact charging device according to the present invention.
Figure 4:
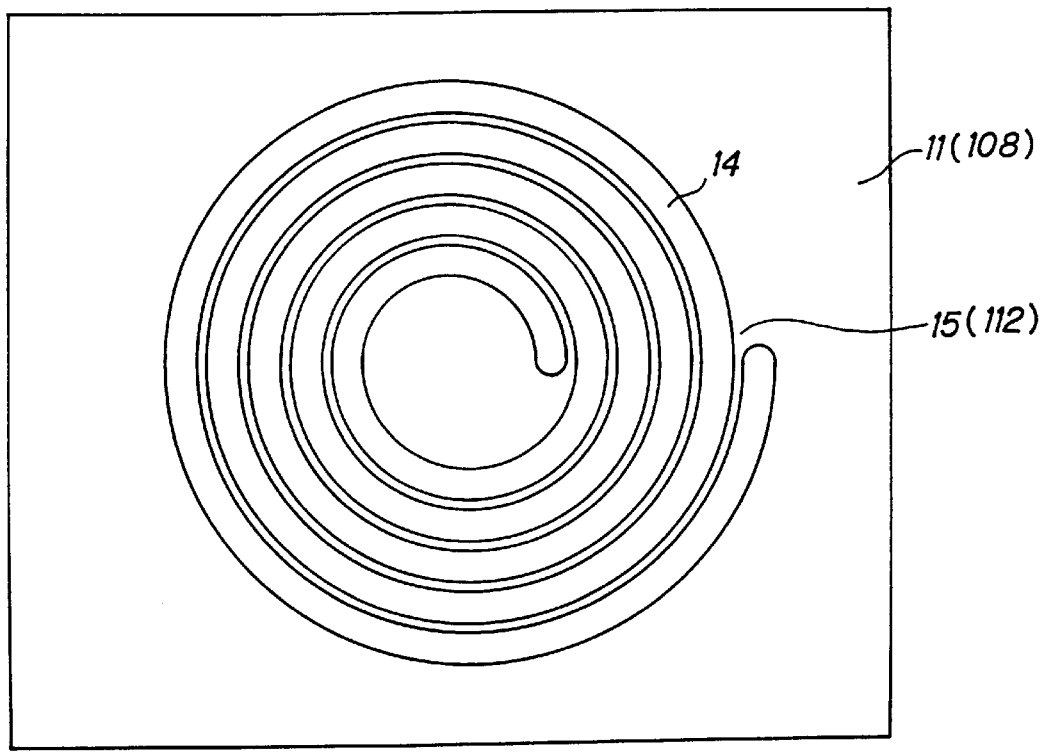
FIG. 4 is a front view showing one embodiment of an induction coil based on a sheet coil system used in the noncontact charging device according to the present invention.

A capacitor 17 is mounted on a rear surface of the printed board 11. This capacitor 17 is connected, as shown in FIG. 3, in parallel to the primary side induction coil 15, and forms an LC parallel resonance circuit in the primary side together with the primary side induction coil 15. A high-frequency power 19 is connected to the LC parallel resonance circuit in the primary side.

The printed board 108 is seated on the internal surface of the bottom surface section 106 of the handset unit 100 with the engaging claw 110. A conductor is spirally patterned on a surface on the printed board 108 (on a surface of the side of the bottom surface 106) like in the printed board 11, and with the conductor, a pattern inductor, in other words, a secondary side induction coil 112 having a spiral form comprising a sheet coil is formed on the surface.

A sheet coil face (surface) of the printed board 108 is seated on the bottom surface section 106 of the printed board 108 with the engaging claw 110 and uniformly contacts and joints to the entire internal surface of the bottom surface section 106. Also this feature is one of the important requirements for maintaining a gap between coils at an appropriate value during mutual induction described later.

A capacitor 114 is mounted on a rear surface of the printed board 108. This capacitor 114 is connected in parallel to the secondary side induction coil 112, and forms an LC parallel resonance circuit in the secondary side together with the secondary side induction coil 112. A secondary battery 118 to be charged is connected via a diode 116 to the LC parallel resonance circuit in the secondary side.

In this configuration, when the handset unit 100 is positioned and set on the handset unit mounting base 3 of the charger 1, the bottom surface section 106 of the outer casing 102 faces to and contacts flat to the electromagnetic induction surface section 9, and for this reason in the state where a handset unit has been set, the primary side induction coil 15 and the secondary side induction coil 12 face in parallel to each other with the electromagnetic induction surface section 9 of the outer casing 5 and the bottom surface section 106 of the outer casing 102 therebetween, so that a gap between the primary side induction coil 15 and the secondary side induction coil 112 is inevitably decided by a total of wall thickness of the electromagnetic induction surface section 9 and that of the bottom surface section 106.

With this feature, only by setting wall thickness of the electromagnetic induction surface section 9 and that of the bottom surface section 106 to appropriate values respectively, it is possible to accurately set a gap between the primary side induction coil 15 and the secondary side induction coil 112 to a value at which the critical connection state can be achieved.

With the configuration described above, a double tuning circuit is formed with a combination of LC parallel resonance circuits formed in the charger 1 and the handset unit 100 respectively, and power transmission from the charger 1 to the handset unit 100 is executed by means of mutual induction by the double tuning circuit.

As each of the primary side induction coil 15 and the secondary side induction coil 112 is formed with a sheet coil, construction of the coil itself and mounting construction for the coil do not become complicated, and with the induction coils, mutual induction is efficiently performed with a large magnetic connection area with an appropriate gap at which the critical connection state can be achieved and without making larger size and weight of the coil.

Especially in a double tuning circuit based on a combination of the LC parallel resonance circuits, the critical connection state is achieved depending on the magnetic connection coefficient, so that, by setting a gap between the primary side induction coil 15 and the secondary side induction coil 112 to an appropriate value, the critical connection state can be obtained, and efficient power transmission can be performed with the maximum and single peak frequency characteristics.

Figure 5:
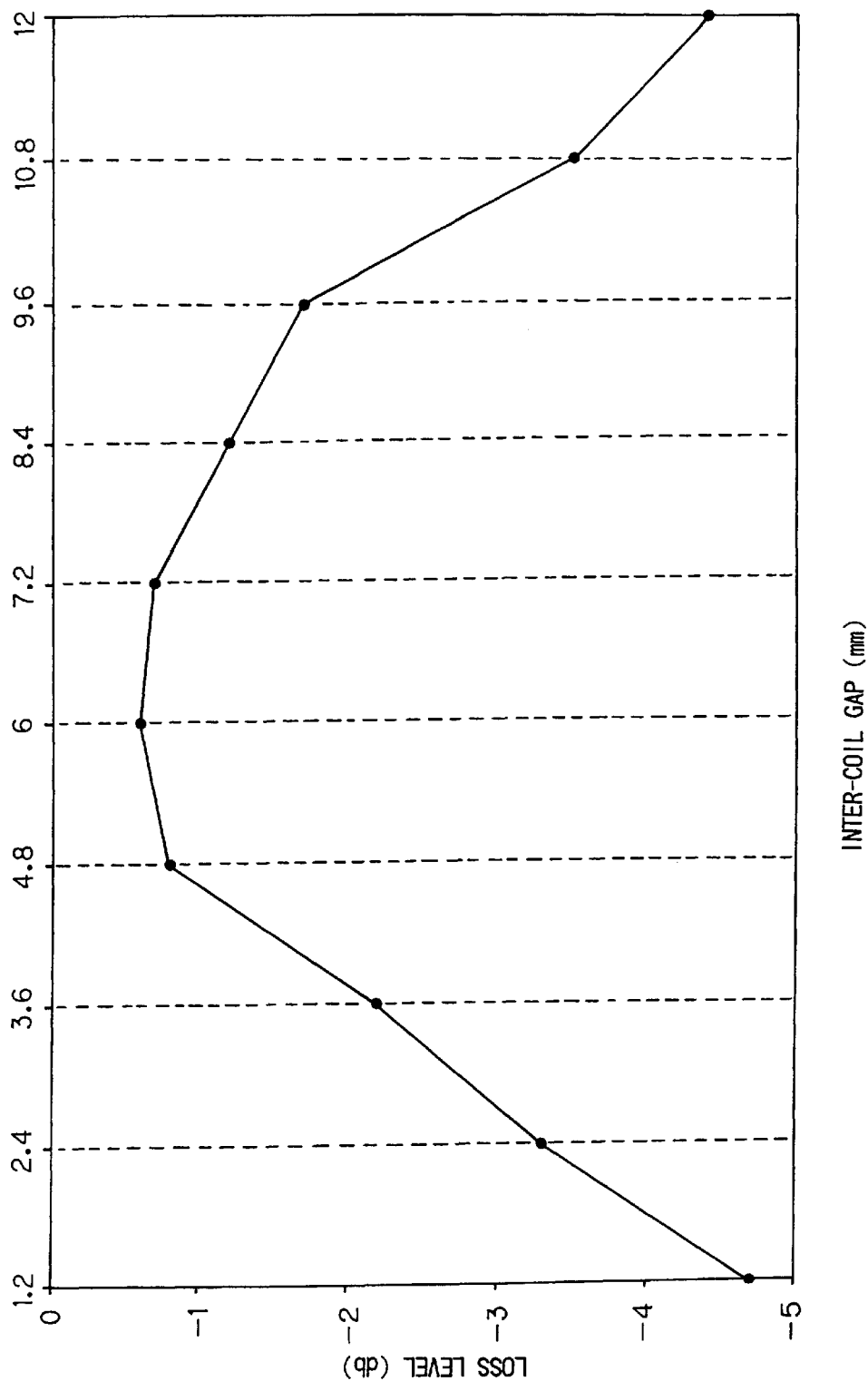
FIG. 5 is graph showing the inter-coil gap/loss level characteristics for a harmonic frequency in the double tuning circuit.

FIG. 5 shows the inter-coil gap/loss level characteristics for the harmonic frequency. This graph shows that, in a case where the inter-coil gap is 6 mm, the loss level is minimum with excellent mutual induction state, and that, in a case where the inter-coil gap is more than or less than 6 mm, the loss level increases with the mutual induction state degraded.

Accordingly, in this case, the appropriate gap enabling the critical connection state is 6 mm, and wall thickness of the electromagnetic induction surface section 9 and that of the bottom surface section 106 should be set to 3 mm respectively.

Sheet coils of the primary side induction coil 15 and the secondary side induction coil 112 respectively are spirally patterned on surfaces of the printed boards 11 and 108, so that a large planary magnetic field is obtained with a small space and a large magnetic connection area can be obtained without making larger size and weight of the coils.

With the features described above, efficient power transmission is performed with little wasteful power consumption.

Further this sheet coil is formed with a pattern inductor provided on a printed board, and the pattern inductors are mass-produced with stable performance and low cost by making use of the printed board production technology, so that the sheet coil, in other words, the primary side induction coil 15 and secondary side induction coil 112 are formed with low cost products with stable quality, which allows cost reduction.

Figure 2:
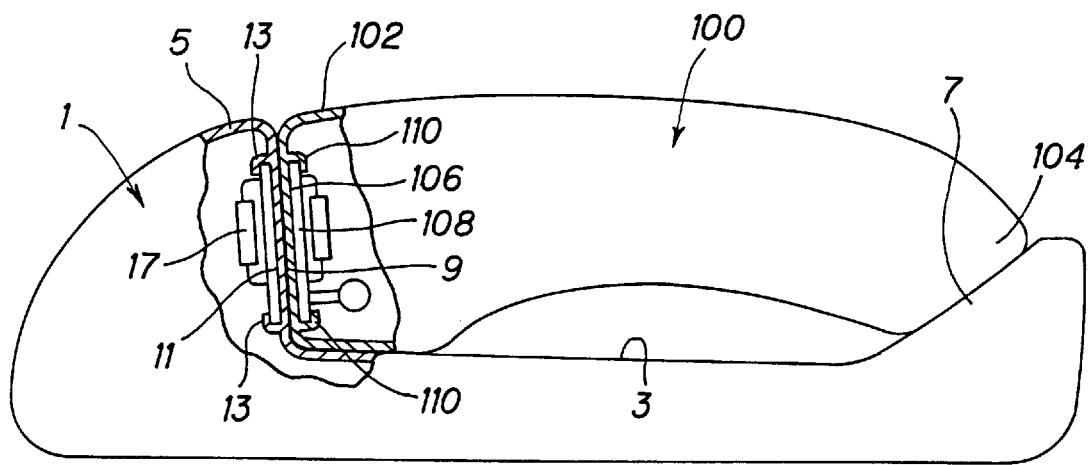
FIG. 2 is a partial cross-sectional view showing one embodiment of the noncontact charging device according to the present invention.
Figure 6:
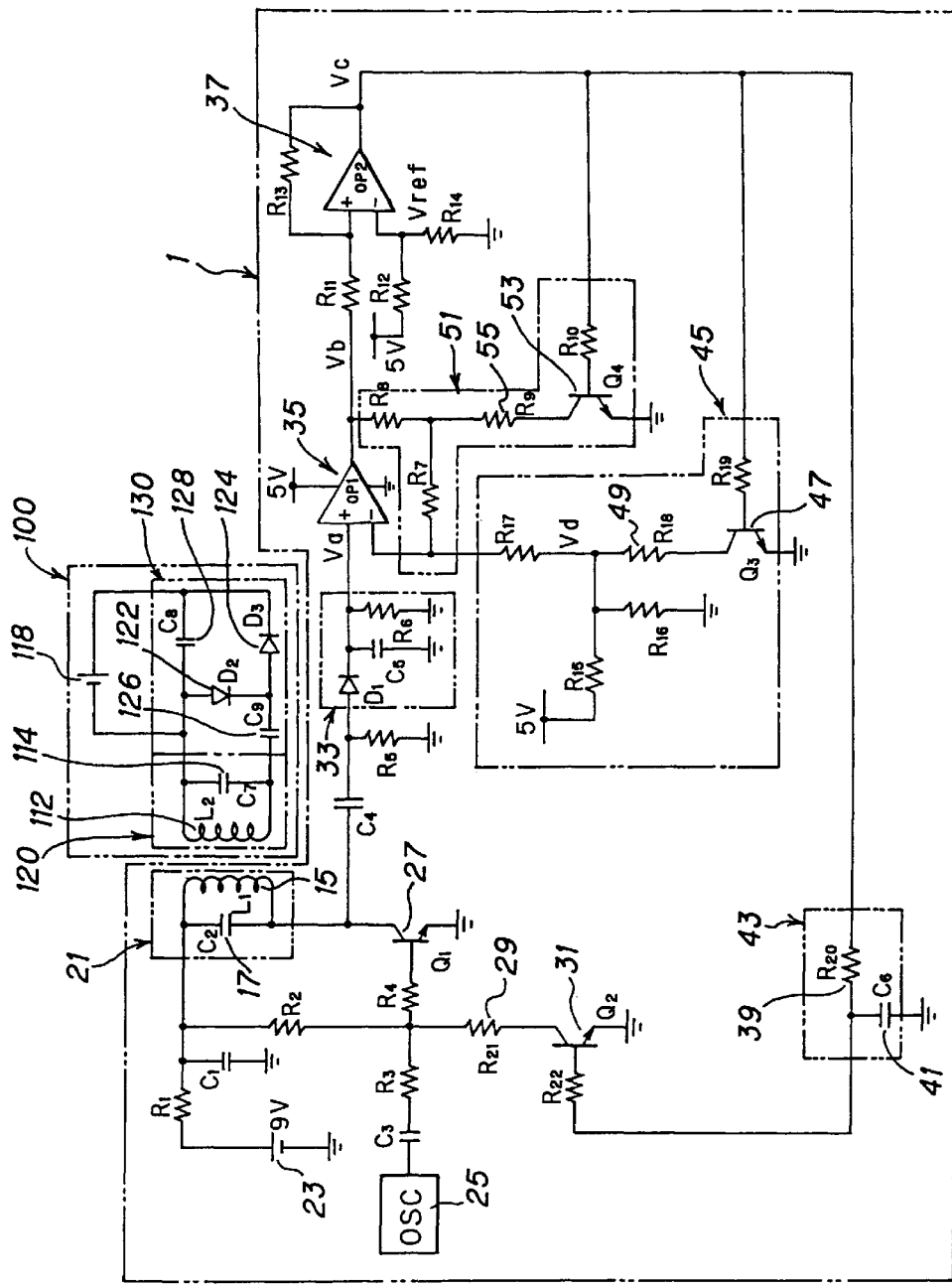
FIG. 6 is a circuit diagram showing one embodiment of electric circuits in the noncontact charger as well as in the cordless equipment (handset unit) according to the present invention.

FIG. 6 shows electric circuits in a noncontact charger as well as in a cordless equipment (handset unit). It should be noted that the same reference numerals as those used in FIG. 1 to FIG. 3 are assigned to portions corresponding to those in FIG. 1 to FIG. 3.

The noncontact charger 1 comprises an LC parallel resonance circuit 21 formed with a primary side induction coil 15 ($L_1$) and a capacitor 17 ($C_2$), a DC current source 23 obtained from, for instance, an AC adapter, an oscillation circuit 25 comprising, for instance, a CR oscillator, a resonance circuit driving transistor 27 ($Q_1$) for driving the LC parallel resonance circuit 21 at a high frequency when a high-frequency signal outputted from the oscillation circuit 25 is given to a gate terminal, a resonance state switching transistor 31 ($Q_2$) for switching a oscillation voltage level in the LC parallel resonance circuit 21 between a high level and a low level by opening and closing a circuit for a partial voltage resistance 29 ($R_{21}$), a detection circuit 33 ($D_1$, $C_5$, $R_6$) connected to the LC parallel resonance circuit 21 and outputting amplitude of an oscillation frequency signal as a voltage signal Va, a variable amplifier 35 for amplifying an output voltage Va from the detection circuit 33, and a comparator 37 ($OP_2$, $R_{11}$ to $R_{14}$) comparing a voltage Vb amplified by the variable amplifier 35 to a reference voltage Vref for comparison.

When the voltage Vb amplified by the variable amplifier 35 is larger than the reference value Vref for comparison, the comparator 37 determines that the primary side induction coil 15 is not in the mutual conduction state, and outputs an ON signal, and otherwise, namely when the voltage Vb is not larger than the reference value Vref for comparison, the comparator 37 determines that the primary side induction coil is in the mutual induction state, and outputs an OFF signal.

When outputted from the comparator 37, the ON or OFF signal described above, namely a determination signal (output voltage) Vc is inputted via a delay circuit 43 comprising a resistance 39 ($R_{20}$) and a capacitor 41 ($C_5$) into a gate terminal of the resonance state switching transistor 31.

When the primary side induction coil 15 is not in the mutual induction state, namely in the idle state where the handset unit 100 has not been set in the charger 1, the resonance state switching transistor 31 is set in the ON state, sets a oscillation voltage level in the LC parallel resonance circuit 21 to a low level, while, when the primary side induction coil 15 is in the mutual induction state, namely in the state where the handset unit 100 has been set in the charger 1, the transistor 31 is set in the OFF state, and sets a oscillation voltage level in the LC parallel resonance circuit 21 to a high level.

The variable amplifier 35 in this embodiment comprises a non-inverting amplifier which is an operating amplifier (OP$_1$), has a partial voltage resistance 49 (R$_{18}$) selectively connected by a transistor 47 (Q$_3$) to any of the offset voltage circuit 45 (R$_{15}$ to R$_{19}$), and selectively lowers the offset voltage Vd with this partial voltage resistance 49.

The above-described ON/OFF signal (vc) outputted from the comparator 37 is given to a gate terminal of the transistor 47. With this feature, in the idle state where the handset unit 100 is not set in the charger 1, the transistor 47 is set in the ON state, and the offset voltage Vd becomes lower than that during mutual inductance (in the state where the handset unit 100 is set in the charger 1).

Also provided in a return resistance circuit 51 (R$_7$ to R$_{10}$) of the variable amplifier 35 is a partial voltage resistance 55 (R$_9$) selectively connected by a transistor 53 (Q$_4$) to the circuit, and the amplification factor G is selectively made larger by this partial voltage resistance 55.

The above-described ON/OFF signal (Vc) outputted from the comparator 37 is given to a gate terminal of the transistor 53. With this feature, in the idle state where the handset unit 100 is not set in the charger 1, the transistor 53 is set in the ON state, and the amplification factor G of the variable amplifier 35 becomes larger than that in the mutual induction state (in the state where the handset unit 100 is set in the charger 1).

The handset unit 100 has a an LC parallel resonance circuit 120 comprising a secondary side induction coil 112 (L$_2$) and a capacitor 114 (C$_7$), a secondary battery 118, and a double voltage rectification circuit 130 comprising two diodes 122 (D$_2$), 124 (D$_3$) mutually-inversively connected to each other and provided between the resonance circuit 120 and the secondary battery 118 and two smoothing capacitors 126 (C$_9$) and 128 (C$_8$).

It should be noted that, in FIG. 6, signs R$_1$ to R$_{22}$ indicate a resistance respectively, C$_1$ to C$_6$ indicate a capacitor, Q$_1$ to Q$_4$ indicates a transistor respectively, and D$_1$ to D$_3$ indicates a diode respectively.

Figure 7:
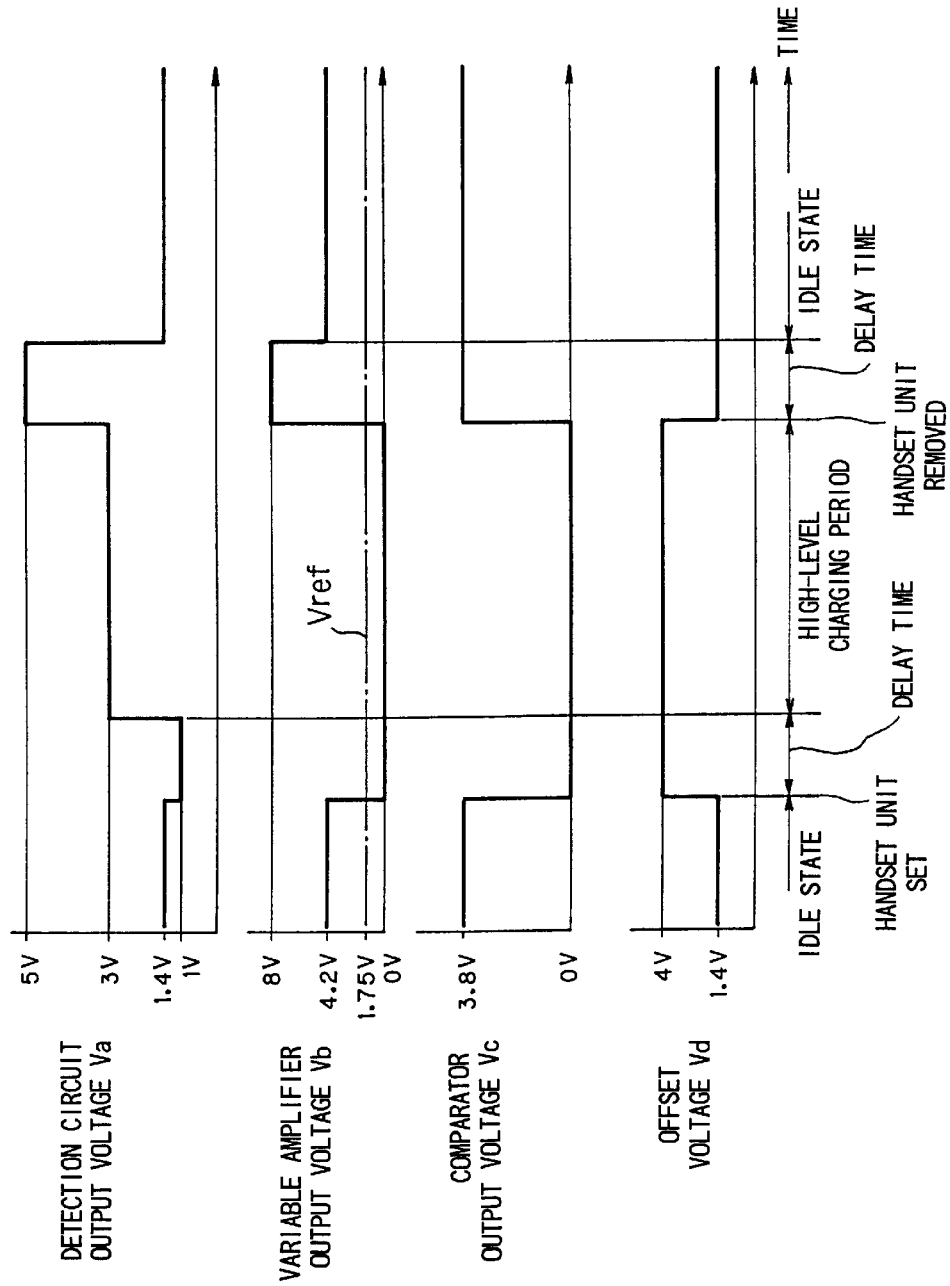
FIG. 7 is a timing chart showing operations of the noncontact charger according to the present invention.

Next description is made for operations of the noncontact charger 1 and handset unit 100 each having the circuit as described above with reference to the timing chart shown in FIG. 7.

In the idle state (in the state where the handset unit 100 has been removed from the charger 1), an output signal Vc from the comparator 37 is at a high level (ON signal), and each of the transistors 31, 47, 53 is ON. Accordingly, in this state, an oscillation level in the resonance circuit 21 is lowered down to, for instance, around 6 Vp-p, an output voltage Va from the detection circuit 33 is around 1.4 V, an offset voltage Vd in the variable amplifier 35 is lowered to around 1.4 V, the amplification factor G on the variable amplifier 35 is lowered to around 7.5, an output voltage Vb from the variable voltage is 4.2 V because Vb=Va (3+G)–G·Vd, the comparison value for reference Vref=1.7 V, so that Vb is larger than Vref and the output signal Vc from the comparator 37 is maintained at a high level (3.8 V).

As described above, in the idle state, a oscillation level in the resonance circuit 21 is lowered, so that, even if a metallic conductor is placed by mistake on the charger 1, substantial induction heating does not occur and wasteful power consumption is lowered.

In this state, when the handset unit 100 is set on the charger 1, mutual induction is started by a double tuning circuit comprising the resonance circuit 21 in the charger 1 and the resonance circuit 120 in the handset unit 100 in the low level oscillation state, and power transmission from the charger 1 to the handset unit 100 is started.

In the handset unit 100, because of existence of the double voltage rectification circuit 130, a voltage between terminals of the secondary battery 118 looks like ½ of the actual value when viewed from the input side, and with this feature, even if the oscillation level is low as described above, when the handset unit 100 is set on the charger, a charging current flows without fail.

With this feature, oscillation amplitude, namely oscillation level in the resonance circuit 21 further lowers to, for instance, around 1 Vp-p. Then an output voltage Va from the detection circuit 33 is around 1.0 V, an output voltage Vb from the variable amplifier 35 is 0 V because Vb=Va (3+G)–G·Vd, a reference value for comparison Vref=1.75 V indicating that Vb<Vref, and an output signal Vc from the comparator 37 is at a low level (0 V).

As a result, each of the transistors 47, 53 is immediately turned OFF with the offset voltage Vd in the variable amplifier 35 raised to around 4 V, and the amplification factor G of the variable amplifier 35 is lowered to around 3 V.

When state switching of the variable amplifier 35 as described above is finished and an output state from the variable amplifier 35 has been stabilized, an output signal Vc (0 V) from the comparator 37 is inputted into the resonance state switching transistor 31 under the delaying effect by the delay circuit 43, and the transistor 31 is turned OFF. With this operation, an oscillation level in the resonance circuit 21 is raised to around 10 Vp-p. Then an output voltage Va from the detection circuit 33 goes up to around 3 V.

In this state, however, an offset voltage Vd in the variable amplifier 35 is raised to around 4 V, and also the amplification factor G of the variable amplifier 35 has been lowered to around 3 V, so that the output voltage Vb from the variable amplifier 35 is 0 V because Vb=Va (1+G)–G·Vd, while the reference value for comparison Vref is 1.75 V, so that the relation of Vb<Vref is maintained, and an output signal Vc from the comparator 37 is maintained at a low level (0 V).

In this state, when the handset unit 100 is removed from the charger 1, load is eliminated, and an oscillation level in the resonance circuit 21 is raised to, for instance, around 17 Vp-p. In this state, an output voltage Va from the detection circuit 33 goes up to around 5 V, an output voltage Vb from the variable amplifier 35 is 8 V because Vb=Va (1+G)–G·Vd, while the reference value for comparison Vref is 1.75 V and Vb is larger than Vref (Vb>Vref), and an output signal Vc from the comparator 37 is changed to a high level (3.8 V). Then, the original idle state is restored.

With the configuration as described above, an offset voltage in the variable amplifier 35 is switched according to whether an oscillation voltage level in the resonance circuit 21 is a high level or a low level, and with only one reference value for comparison Vref for the comparison 37, irrespective of whether an oscillation voltage level in the resonance circuit 21 is a high level or a low level, whether the primary side induction coil 15 is in the mutual induction state or not, namely whether the handset unit 100 is set on the charger 1 or not can accurately be determined.

Also an amplification factor for the variable 35 amplifier in a state other than the mutual induction state is made larger as compared to that in the mutual induction state, so that an output voltage from the variable amplifier largely changes in response to change in oscillation amplitude, and in the idle state where mutual induction state is not effected and an oscillation voltage level in the resonance circuit is at a low level, even if change in oscillation amplifier changes only a little when the handset unit 100 is set in the charger 1, the fact that the handset unit 100 has been set can accurately be detected by the comparator 37.

With the features as described above, whether the handset unit 100 has been set in the charger 1 or not can accurately be detected without requiring any specific sensor.

Figure 8:
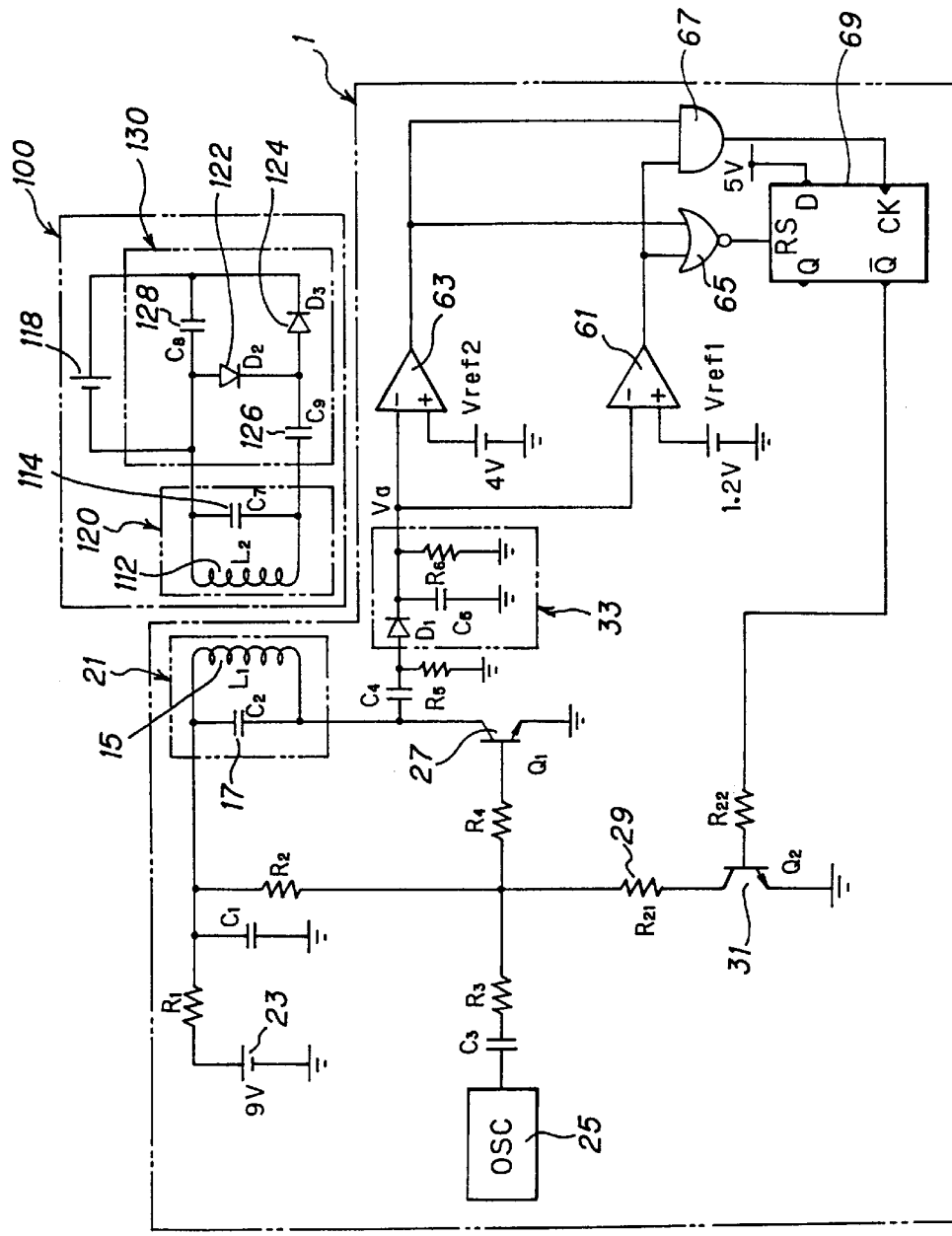
FIG. 8 is a circuit diagram showing another embodiment of electric circuits in the noncontact charger and cordless equipment (handset unit) according to the present invention.

FIG. 8 shows an electric circuit according to another embodiment of the noncontact charger and cordless equipment (handset unit) according to the present invention. It should be noted that, in FIG. 8, the same reference numerals are assigned to portions corresponding to those in FIG. 6 and description thereof is omitted herein.

An output voltage Va from the detection circuit 33 in each state is the same as that in the embodiment described above, and this output voltage Va is inputted into a first comparator 61 as well as into a second comparator 63.

The first comparator 61 compares an output voltage Va to the first reference value for comparison Vref1, and outputs a low signal when Va is larger than Vref1 (Va>Vref1), and otherwise outputs a high signal. As the first reference value for comparison Vref1 is set to around 1.2 V, the first comparator 61 outputs a high signal only when the handset unit 100 is set on the charger 1 in the idle state, and outputs a low signal in the idle state, when charging with a high level output, and when the handset unit 100 is removed from the charger 1 in the charging state with a high level output.

The second comparator 63 compares the output voltage Va to a second reference value for comparison Vref2 larger than the first reference value for comparison Vref1, and when Va is larger than Vref2 (Va>Vref2), outputs a low signals, and otherwise output a high signal. As the second reference value for comparison Vref2 is set to around 4 V, the second comparator 63 outputs a low signal only when the handset unit 100 is removed from the charger 1 in the charging state with high level output, and outputs a low signal, when the handset unit 100 is set in the charger 1 in the idle state, or when charging is executed with high level output.

Output signals from the first comparator 61 and second comparator 63 are inputted to a two-input type of NOR gate 65 and an AND gate 76 respectively. An output signal from the NOR gate 65 is inputted into a reset terminal of the D-latch circuit 69, and an output signal from the AND gate 67 is inputted to a clock terminal of the D-latch circuit 69. The D-latch circuit 69 inverts an inverted Q output signal from ON to OFF according to shift of a signal inputted into the clock terminal from low to high, and also inverts the inverted Q output signal from OFF to ON according to reset input. This inverted Q output signal is inputted to a gate terminal of the resonance state switching transistor 31 as a determination signal indicating whether the primary side induction coil 15 is in the mutual induction state or not.

For this reason, also in this embodiment, when the handset unit 100 is set in the charger 1 in the idle state, an output signal from the NAND gate 67 goes high, while a signal inputted into the clock terminal changes from low to high, so that the inverted Q output signal is inverted from ON to OFF and the resonance state switching transistor 31 is turned OFF, With this feature, an oscillation level in the resonance circuit 21 changes from low level output to high level output.

In contrast, when the handset unit 100 is removed from the charger 1 in the charging state with high level output, an output signals from the NAND gate 65 goes high, and the inverted Q output signal is inverted from OFF to ON according to reset input, and the resonance state switching transistor 31 is turned ON. With this operation, an oscillation level in the resonance circuit 21 is changed from high level output to low level output.

For the reasons described above, also in this embodiment, an oscillation level in the resonance circuit 21 lowers in the idle state, so that, even if a metallic conductor is placed by mistake on the charger 1, substantial induction heating does not occur with wasteful power consumption reduced, and whether the handset unit 100 has been set in the charger 1 or not can accurately be detected without requiring any specific sensor.

As understood from the description above, in the non-contact charging device according to the present invention, each of the primary side induction coil and secondary side induction coil provided in a charger and a cordless equipment respectively comprises a sheet coil, so that construction of the coil itself and the mounting construction thereof are not complicated, and with the induction coils, mutual induction is efficiently executed with a appropriate gap and a large magnetic connection area without making size and weight of the coil larger, and wasteful power consumption is reduced and charging is executed at a high speed.

In the non-contact charging device according to the present invention, by setting a gap between the primary side induction coil and secondary side induction coil to an appropriate value, the critical connection state is achieved and efficient power transmission is executed with the maximum and signal peak frequency characteristics, and also with this feature, wasteful power consumption is reduced and charging is executed at a high speed.

In the noncontact charging device according to the present invention, a sheet coil is spirally patterned on one plane, so that a large and flat magnetic field is obtained with a small space and a large magnetic connection area is obtained without making larger size and weight of each coil, and also with this feature, wasteful power consumption is reduced and charging is executed at a high speed.

In the noncontact charging device according to the present invention, a sheet coil comprises a pattern inductor patterned on a printed board, and as pattern inductors can be mass-produced with stable performance and high productivity and also with low cost, the sheet coil can comprises a low cost product with excellent and stable quality.

The charger according to the present invention functions as the noncontact charger according to the present invention, so that wasteful power consumption is reduced and charging is executed at a high speed.

The cordless equipment according to the present invention functions as a cordless equipment in the noncontact charging device according to the present invention, so that wasteful power consumption is reduced and charging is executed at a high speed.

In the noncontact charger according to the present invention, when a cordless equipment is set in the charger, mutual induction state is detected by the mutual induction state detecting means and an oscillation voltage level in the resonance circuit is set by the resonance state switching means to a high level, and if a cordless equipment is not set in the charger, the mutual induction state detecting means detects that the mutual induction state has not been effected, and a oscillation voltage level in the resonance circuit is set by the resonance state switching means to a low level, so that, even if a metallic conductor is placed by mistake on the charger in the idle state which is different from the mutual induction state, substantial induction heating does not occur with wasteful power consumption reduced, and whether any cordless equipment is placed on the charger or not can accurately be detected without requiring any specific sensor.

In the noncontact charger according to the present invention, an offset voltage in the variable amplifier is switched according to whether a oscillation voltage level in the resonance circuit is at a high level or a low level, so that, even with only one reference value for comparison, whether the primary side induction coil is in the mutual induction state or not can accurately be determined irrespective of whether a oscillation voltage level in the resonance circuit is high or low.

In the noncontact charger according to the present invention, a determination signal is given to the variable amplifier, and an amplification factor for the variable amplifier in a state other than the mutual induction state is made larger as compared to that in the mutual induction state, so that even if oscillation amplitude changes only a little when a cordless equipment is set in the charger in the idle state where a cordless equipment is not set in the charger, the fact that the cordless equipment has been set can accurately be detected by the compactor.

In the noncontact charger according to the present invention, input of a determination signal into the oscillation state switching means is delayed by the delay circuit, and switching of oscillation state is performed after output state of the variable amplifier has been stabilized, so that hunting never occurs and an operation for switching the oscillation state is executed under stable conditions.

In the noncontact charger according to the present invention, a determination signal indicating whether the induction coil is in the mutual induction state or not is outputted with a combination of output signals from the first comparator and second comparator, and for this reason whether a cordless equipment has been set on the charger or not can accurately be detected without requiring any specific sensor.

In the cordless equipment according to the present invention, a voltage between terminals of the secondary battery seems to be ½ of the actual value when viewed from the input side because of existence of the double voltage rectification circuit, so that, even if an oscillation level in the stand-by state is low, a charging current flows without fail when a cordless equipment is set in the charge, and the fact that the cordless equipment has been set in the charger can accurately be detected in the charger side according to change in oscillation amplitude.

This application is based on Japanese patent application No. HEI 8-173976 filed in the Japanese Patent Office on Jul. 3, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A noncontact charging device for transmitting power, by making use of mutual induction between a primary side induction coil provided in a charger and a secondary side induction coil provided in a cordless equipment incorporating a secondary battery therein, from said charger to said cordless equipment and charging said secondary battery; wherein capacitors are connected in parallel to said primary side induction coil as well as to said secondary side induction coil respectively and an LC parallel resonance circuit is formed with this parallel connected in each of said charger and said cordless equipment, each of said primary side induction coil and said secondary side induction coil is built with a sheet coil and the sheet coils are provided and fixed in said charger and said cordless equipment so that the sheet coils face to each other at a specified gap from each other in the charging state where said cordless equipment is set in said charger.

2. A noncontact charging device according to claim 1, wherein the charger is provided in a base unit of a telephone set.

3. A noncontact charging device according to claim 1, wherein the cordless equipment is provided in a handset unit of a telephone set.

4. A noncontact charging device according to claim 1; wherein said gap is set to a dimension where a critical connection state can be achieved between said primary side induction coil and said secondary side induction coil.

5. A noncontact device according to claim 4, wherein the charger is provided in a base unit of a telephone set.

6. A noncontact charging device according to claim 4, wherein the cordless equipment is provided in a handset unit of a telephone set.

7. A noncontact charging device according to claim 1; wherein said sheet coil is spirally patterned on a plane.

8. A noncontact charging device according to claim 7, wherein the charger is provided in a base unit of a telephone set.

9. A noncontact charging device according to claim 7, wherein the cordless equipment is provided in a handset unit of a telephone set.

10. A noncontact charging device according to claim 1; wherein said sheet coil comprises a pattern inductor patterned on a printed board.

11. A noncontact charging device according to claim 10, wherein the charger is provided in a base unit of a telephone set.

12. A noncontact charging device according to claim 10, wherein the cordless equipment is provided in a handset unit of a telephone set.

13. A noncontact charger for transmitting power to a cordless equipment including a secondary side induction coil and a secondary battery by making use of mutual induction by a primary side coil to charge said secondary battery comprising:

a resonance circuit including a primary side induction coil;

a resonance state switch for switching a resonant voltage level in said resonance circuit between a high level and a low level; and a mutual induction state detector for checking whether said primary side induction coil is in the mutual induction state or not according to oscillation amplitude in said resonance circuit; wherein the a oscillation voltage level in said resonance circuit is set to a high level by said resonance state switch when a mutual induction state is being detected by said mutual induction state detector, and otherwise is set to a low level by said resonance state switch.

14. A cordless equipment charged by a noncontact charger according to claim 13; wherein a rectification circuit provided between the secondary side induction coil and the secondary battery is a double voltage rectification circuit.

15. A noncontact charger according to claim 13; wherein said mutual induction state detector comprises a variable amplifier for catching change in oscillation amplitude in said resonance circuit as a voltage change and amplifying it, and a comparator for comparing an output voltage from said variable amplifier to a reference value for comparison; said comparator outputs a determination signal indicating according to a result of comparison whether said primary side induction coil is in the mutual induction state or not; and said variable amplifier sets an offset voltage in the state where the mutual induction state has not been effected to a level lower than that in the state where the mutual induction state has been effected according to said determination signal.

16. A cordless equipment charged by a noncontact charger according to claim 15; wherein a rectification circuit provided between the secondary side induction coil and the secondary battery is a double voltage rectification circuit.

17. A noncontact charger according to claim 15 comprising a delay circuit for delaying a timing when said determination signal is given to said oscillation state switch.

18. A cordless equipment charged by a noncontact charger according to claim 17; wherein a rectification circuit provided between the secondary side induction coil and the secondary battery is a double voltage rectification circuit.

19. A noncontact charger according to claim 15; wherein said variable amplifier sets an amplification factor in the state where it is determined according to a determination signal outputted from said comparator that the mutual induction state has not been effected to a level higher than that in the state where the mutual induction state has been effected.

20. A cordless equipment charged by a noncontact charger according to claim 19; wherein a rectification circuit provided between the secondary side induction coil and the secondary battery is a double voltage rectification circuit.

21. A noncontact charger according to claim 19 comprising a delay circuit for delaying a timing when said determination signal is given to said oscillation state switch.

22. A cordless equipment charged by a noncontact charger according to claim 21; wherein a rectification circuit provided between the secondary side induction coil and the secondary battery is a double voltage rectification circuit.

23. A noncontact charger according to claim 13; wherein said mutual induction state detector comprises a first comparator for comparing a resonance voltage obtained according to oscillation amplitude in said resonance circuit to a first reference value for comparison and a second comparator for comparing a resonance voltage obtained according to oscillation amplitude in said resonance circuit to a second reference value for comparison larger than the first reference value for comparison, and a determination signal indicating whether said primary side induction coil is in the mutual induction state or not is outputted according to a combination of an output signal from said first comparator and that from said second comparator.

24. A cordless equipment charged by a noncontact charger according to claim 23; wherein a rectification circuit provided between the secondary side induction coil and the secondary battery is a double voltage rectification circuit.

\* \* \* \* \*